United States Patent [19]

Hathaway et al.

[11] Patent Number: 4,808,672

[45] Date of Patent: Feb. 28, 1989

[54] THERMALLY STABLE POLYPHENYLENE ETHER HAVING TERMINAL ANTHRANILATE ESTER GROUPS

[75] Inventors: Susan J. Hathaway, Schenectady, N.Y.; Choong Y. Han, Evansville, Ind.

[73] Assignee: General Electric Company, Schenectady, N.Y.

[21] Appl. No.: 77,912

[22] Filed: Jul. 27, 1987

[51] Int. Cl.$^4$ .............................................. C08G 65/44
[52] U.S. Cl. ..................................... 525/397; 525/390; 528/216
[58] Field of Search ................ 525/397, 390; 528/216

[56] References Cited

U.S. PATENT DOCUMENTS 3,375,228  3/1968  Holoch et al. ................... 260/47
4,058,504 11/1977  Yonemitsu et al. .............. 525/397

OTHER PUBLICATIONS

Venuti, M. C., "Isatoic Anhydride/4-Dimethylaminopyridine as a Reagent for Ortho-Aminobenzoylation", Synthesis (Communications), pp. 266–268, 1982.

Primary Examiner—Harold D. Anderson
Attorney, Agent, or Firm—William A. Teoli; James C. Davis, Jr.; James Magee, Jr.

[57] ABSTRACT

Heating polyphenylene ether in the presence of isotoic anhydride and organic solvent has been found to enhance the thermal stability of the polyphenylene ether.

4 Claims, No Drawings

THERMALLY STABLE POLYPHENYLENE ETHER HAVING TERMINAL ANTHRANILATE ESTER GROUPS

BACKGROUND OF THE INVENTION

The present invention relates to a method for improving the thermal stability of polyphenylene ethers and to polyphenylene ethers having terminal anthranilate ester groups obtained therefrom.

As shown in copending application, Ser. No. 028,857, filed Mar. 23, 1987, assigned to the same assignee as the present invention and incorporated herein by reference, polyphenylene ethers having improved heat stability can be made by end-capping the polyphenylene ether in the melt with a salicylic acid ester. Experience has shown that end capping of polyphenylene ether can preclude, or reduce undesirable cross-linking of the polyphenylene ether, or undesirable interactions between the polyphenylene ether and another polymer. It is, therefore, desirable to provide alternate techniques for end capping polyphenylene ethers to enhance the thermal stability of these polymers.

The present invention is based on our discovery that heating polyphenylene ether in the presence of isatoic anhydride and an inert organic solvent such as toluene, has been found to enhance the thermal stability of the resulting polyphenylene ether.

STATEMENT OF THE INVENTION

There is provided by the present invention, a method for improving the thermal stability of polyphenylene ether having terminal groups selected from the class consisting of,

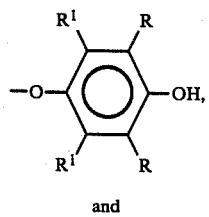

(1)

and

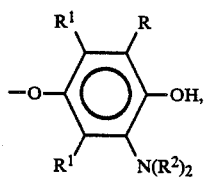

(2)

and a mixture thereof, comprising heating the polyphenylene ether at a temperature of from 100° C. to 150° C. in the presence of an inert organic solvent and an effective amount of isatoic anhydride until the polyphenylene ether is end capped with anthranilate ester groups, where R and $R^1$ are as defined below.

Radicals included by R of formulas (1) and (2) are, for example, halogen, primary or secondary lower alkyl having up to 7 carbon atoms, phenyl, haloalkyl, phenylalkyl, hydrocarbonoxy or halohydrocarbonoxy, where at least two carbon atoms separate the halogen and oxygen atoms; $R^1$ is a member selected from hydrogen, halogen, primary or secondary lower alkyl, for example methyl, ethyl, propyl, isopropyl, butyl, phenyl, haloalkyl, hydrocarbonoxy or halohydrocarbonoxy as defined for R. $R^2$ is selected from $C_{(1-8)}$ alkyl radicals, such as methyl, ethyl, propyl, butyl, pentyl, hexyl, etc. The polyphenylene ethers which can be used in the practice of the method of the present invention consists essentially of chemically combined units of the formula.

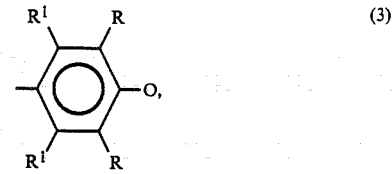

(3)

where R and $R^1$ are as defined above.

Both homopolymer and copolymer polyphenylene ethers are known. Illustrative homopolymers are those containing 2,6-dimethyl-1,4-phenylene ether units. Illustrative copolymers include random copolymers containing such units in combination with (for example) 2,3,6-trimethyl-1,4-phenylene ether units. Many such random copolymers, as well as homopolymers, are disclosed in the patent literature.

The method of the invention is applicable to any known polyphenylene ether, including all of those described hereinabove. It is particularly useful with poly(2,6-dimethyl-1,4-phenylene ethers). Suitable polymers generally have a number average molecular weight within the range of about 3,000–40,000 and a weight average molecular weight within the range of about 20,000–80,000, as determined by gel permeation chromatography. Their intrinsic viscosities are most often in the range of about 0.35–0.6 dl./g., as measured in chloroform at 25° C.

For the most part, it is desirable for all hydroxy end groups on the polyphenylene ether to be capped by the method of this invention.

Also known are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acylonitrile and vinylaromatic compounds (e.g. styrene), or such polymers as polystyrenes and elastomers. The product typically contains both grafted and ungrafted moieties.

Polyphenylene ethers are typically prepared by the oxidative coupling of at least one corresponding monohydroxyaromatic compound. Particularly useful and readily available monohydroxyaromatic compounds are 2,6-xylenol (wherein each R is methyl and each $R^1$ is hydrogen), whereupon the polymer may be characterized as a poly(2,6-dimethyl-1,4-phenylene ether), and 2,3,6-trimethylphenol (wherein each R and one $R^1$ is methyl and the other $R^1$ is hydrogen).

A variety of catalyst systems are known for the preparation of polyphenylene ethers by oxidative coupling. For the most part, they contain at least one heavy metal compound, such as a copper, manganese or cobalt compound, usually in combination with various other materials.

A first class of operative catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds are also known. They are generally alkaline systems in which divalent manganese is combined with such anions as halide, alkoxide or phenoxide. Most often, the manganese is present as a complex with one or more complexing and/or chelating agents, such as dialkylamines, alkanolamines, alkylenediamines, o-hydroxyaromatic aldehydes, o-hydroxyazo compounds, ω-hydroxyoximes (monomeric and polymeric), o-hydroxyaryloximes and β-diketones. Also useful are cobalt-containing catalyst systems. Suitable manganese and cobalt-containing catalyst systems for polyphenylene ether preparation are known in the art by reason of disclosure in numerous patents and publications.

Polymers containing the aminoalkyl-substituted end groups of formula (2) are obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by rkeplacing one of the α-hydrogen atoms on one or more R radicals. The principal site of reaction is the R radical adjacent to the hydroxy group on the terminal unit of the polymer chain. During further processing and/or blending, the aminoalkyl-substituted end groups may undergo various reactions, probably involving a quinone methide-type intermediate of the formula,

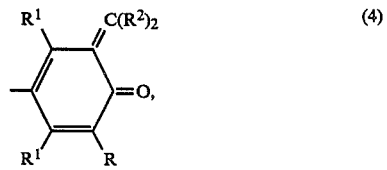

(4)

In many polyphenylene ethers obtained under the above-described conditions, a substantial proportion of the polymer molecules, typically constituting as much as about 90% by weight of the polymer contain end groups having one or frequently both of formulas (1) and (2).

Suitable organic solvents which can be used in the practice of the method of the present invention are, for example, toluene, xylylene, chlorobenzene, and dichlorobenzene.

The polyphenylene ethers utilized in the practice of the method of the present invention can be stabilized by a hot capping procedure employing an organic solvent, as previously defined, and isatoic anhydride. A mixture of the polyphenylene ether, inert organic solvent and isatoic anhydride can be combined and heated over a period of from 48 to 168 hours with agitation at a temperature of from 100° C. to 150° C. Depending upon the boiling point of the organic solvent, refluxing of the mixture can be performed.

In order to provide effective results, there can be used 2 parts to 20 parts by weight of isatoic anhydride per hundred parts of polyphenylene ether. There also can be used from 1% to 20% by weight of solids based on the total of the solids and inert organic solvent for effective end capping results.

In order that those skilled in the art will better be able to practice the present invention, the following example is given by way of illustration and not by way of limitation. All parts are by weight.

EXAMPLE

A mixture of 10 grams of polyphenylene ether having 0.8 millimole of end groups, as shown by formulas (1) and (2), 0.65 grams (4 millimoles) of isatoic anhydride and 0.49 grams (4 millimoles) of 4-dimethylaminopyridine were combined in 100 ml of toluene and refluxed under a nitrogen atmosphere for two days. There was then added 300 ml of acetone to the mixture resulting in the precipitation of product. The product was reprecipitated three times from a mixture of chloroform with acetone. The residue was dried overnight at 60° C. in a vacuum oven. Based on method of preparation, the product was a polyphenylene ether having terminal anthranilate ester groups having the formula,

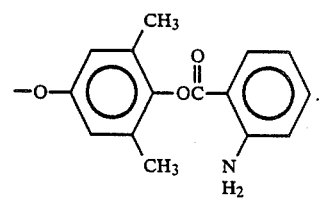

The identity of the product was further confirmed by Carbon 13 Nuclear Magnetic Resonance and Fourier Transform INFRARED analysis.

The above polyphenylene ether having terminal anthranilate ester groups was dissolved in 20 ml of phenylether, and heated at 250° C. under a nitrogen atmosphere for two hours. The solution was allowed to cool to room temperature and the resulting gel was mixed with 70 ml of acetone resulting in the precipitation of product. The product was reprecipitated three times with chloroform in acetone, dried at 60° C. in the vacuum oven for 12 hours. A $^{13}$CNMR and FTIR analysis of the terminal groups of the polyphenylene ether showed that the anthranilate ester linkages remained intact. As a result, those skilled in the art would know that anthranilate ester end capped polyphenylene ethers would exhibit superior temperature stability during extrusion to preclude undesirable cross-linking of the polyphenylene ether as well as undesirable interreactions between the polyphenylene ether and other extrudable polymers blended with the polyphenylene ether.

Although the above example is directed to only a few of the very many variables which can be utilized in the practice of the method of the present invention, it should be understood that the method of the present invention is effected to the use of a much broader variety of polyphenylene ethers and conditions as shown in the description preceding this example.

What is claimed and sought to be protected by Letters Patent of the United States is as follows:

1. A method for improving the thermal stability of polyphenylene ether having terminal groups selected from a class consisting of,

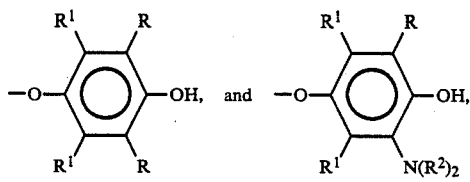 and a mixture thereof, which method comprises heating the polyphenylene ether in the presence of an inert organic solvent at a temperature of from 100° C. to 150° C. and an effective amount of isatoic anhydride until the polyphenylene ether is end capped with anthranilate ester groups, having the formula,

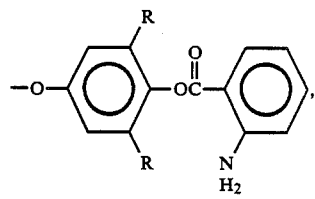

where R is a member selected from the class consisting of halogen, primary or secondary lower alkyl having up to 7 carbon atoms, phenyl, haloalkyl, phenylalkyl, hydrocarbonoxy or halohydrocarbonoxy, where at least two carbon atoms separate the halogen and oxygen atoms, $R^1$ is a member selected from hydrogen, halogen, primary or secondary lower alkyl, phenyl, haloalkyl, hydrocarbonoxy or halohydrocarbonoxy as defined for R, and $R^2$ is selected from $C_{(1-8)}$ alkyl radicals.

2. A method in accordance with claim 1, where the organic solvent is toluene.

3. A method in accordance with claim 1, where there is utilized substantially equal molar amounts of 4-dimethylaminopyridine and isatoic anhydride.

4. A polyphenylene ether having terminal anthranilate ester groups made in accordance with the method of claim 1.

* * * * *